A. LUCYSHYN.
RAILROAD STATION INDICATOR.
APPLICATION FILED OCT. 29, 1919.
1,414,700.
Patented May 2, 1922.
2 SHEETS—SHEET 1.
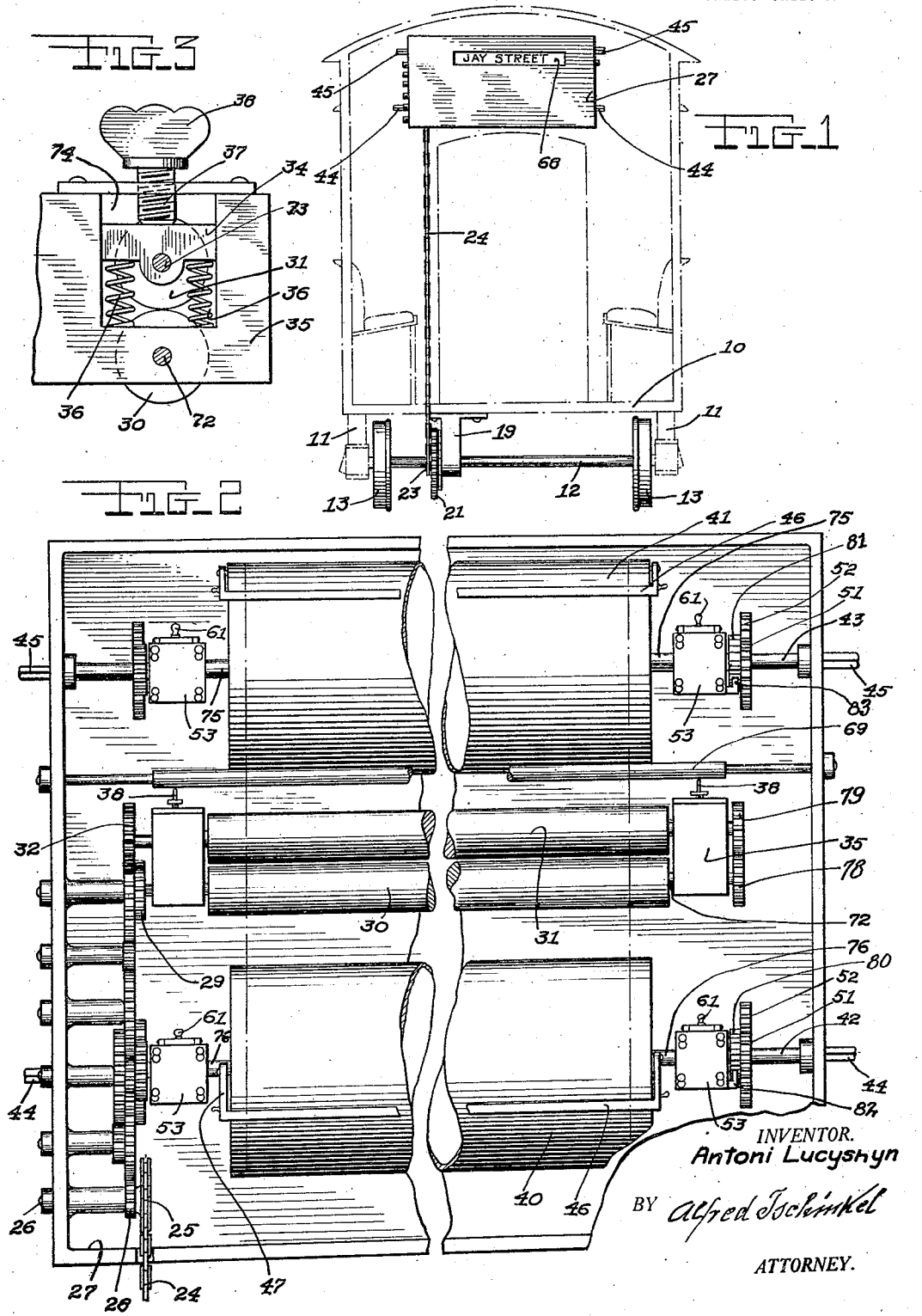
INVENTOR.
Antoni Lucyshyn
BY Alfred Tschinkel
ATTORNEY.

A. LUCYSHYN.
RAILROAD STATION INDICATOR.
APPLICATION FILED OCT. 29, 1919.
1,414,700.
Patented May 2, 1922.
2 SHEETS—SHEET 2.
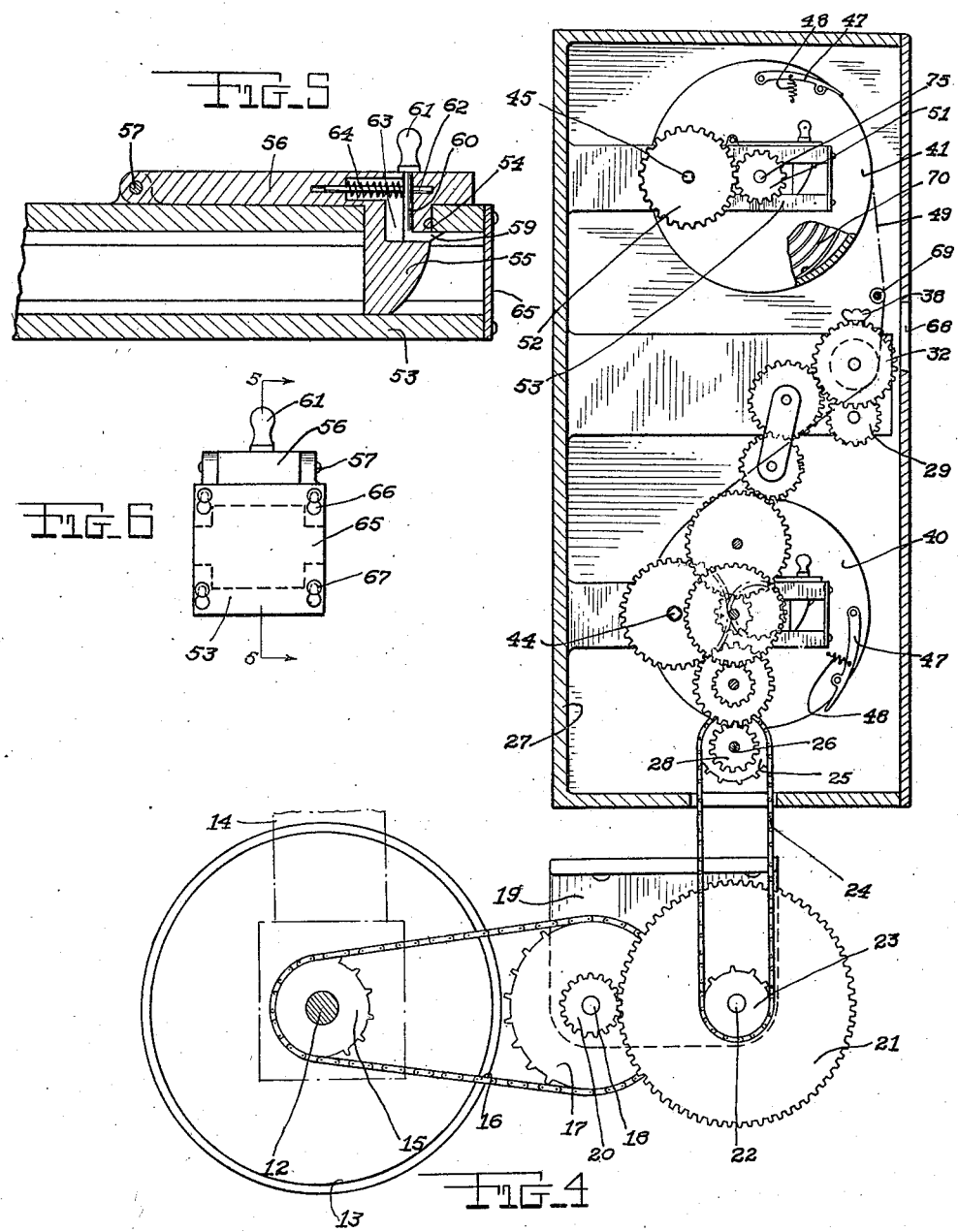
INVENTOR.
Antoni Lucyshyn
BY Alfred Jehinkel
ATTORNEY.

UNITED STATES PATENT OFFICE.

ANTONI LUCYSHYN, OF TORONTO, ONTARIO, CANADA.

RAILROAD STATION INDICATOR.

1,414,700. Specification of Letters Patent. Patented May 2, 1922.

Application filed October 29, 1919. Serial No. 334,288.

*To all whom it may concern:*

Be it known that I, ANTONI LUCYSHYN, a citizen of Ruthenia, residing at Toronto, Province of Ontario, and Dominion of Canada, have invented certain new and useful Improvements in Railroad Station Indicators, of which the following is a specification.

This invention has as its object to provide a sign indicating the various stations at which the car will stop.

A further object is to provide means whereby the display sign is actuated by the axle of the car and not dependent upon manual effort.

These objects are attained by the novel construction and combination of parts hereinafter described and shown in the accompanying drawings forming a material part of this disclosure, and in which—

Figure 1 is an end view showing in broken lines a conventional type of car and indicating the application of the invention.

Figure 2 is a front elevational view of the mechanism by which the indicator is actuated, the cover being removed in order to show the structure.

Figure 3 is an enlarged fragmentary view showing the manner of mounting the pressure rollers.

Figure 4 is a transverse sectional view taken on Figure 2, the view being largely diagrammatic in its character and indicating the driving means for the register.

Figure 5 is an enlarged fragmentary sectional view showing the manner of mounting the display rollers, the view being taken on line 5—5 of Figure 6, and Figure 6 is a top plan view of the same.

Referring to the drawings in detail, the numeral 10 indicates the flooring of a conventional type of car, below which extend journals for the axle 12 of the car wheels 13.

A supplementary bracket 14 extends downward from the floor of the car in which the axle 12 passes, and secured upon the axle, adjacent the bracket 14, is a sprocket wheel 15, over which is trained a chain 16, conveying rotary motion to another sprocket wheel 17, centered on a shaft 18, carried in the bracket 19, extending downward from the flooring of the car. Rigidly engaged upon the shaft 18 is a spur pinion 20, meshing with a gear 21, fixed upon a shaft 22, also rotatable in another portion of the pendent bracket 29, the arrangement of sprocket drive and gears being such as to rotate the shaft 22 at a much lower velocity than the axle 12.

Fixed upon the shaft 22 is a sprocket wheel 23, communicating rotary motion through a chain 24, to a sprocket wheel 25, fixed upon a stub shaft 26, journalled in one of the side walls of a casing 27 in which the registering mechanism is disposed.

Fixed upon the stub shaft 26, adjacent to the sprocket wheel 25, is a spur pinion 28, the same being the first in a reduction gear train eventually actuating, at a greatly reduced rate of speed, a gear 29 driving a roller 30, mounted transversely in the casing 27, a mating roller 31 being arranged closely adjacent, driven by a gear 32 meshing with a gear of the gear train.

These rollers are also directly geared together by the gears 78 and 79 on the ends of the respective roller shafts 72 and 73 the same passing through the block 35.

The roller 30 is fixed upon a shaft 72 rotatable in bearing blocks 35, while the roller 31 is similarly mounted on a shaft 73 rotatable in bearings 34, slidably engaged in the blocks 35, the bearings 34 resting on pairs of springs 36, extending from the lower portions of the recesses 74 in which the bearings 34 are contained, the bearings being pressed downward by screws 37, having extending operating heads 38, the purpose being to adjust the rollers 30 and 31 in their relative distance apart.

A pair of drums 40 and 41 are mounted on spindles 75 and 76, journalled in the casing 27, and having secured upon their ends pinions 51 engageable with the gears 52, fixed upon the shafts 42 and 43.

The shafts 42 and 43 are formed with rectangular ends 44 and 45 to which may be engaged a wrench or key for turning them and alongside the pinions 51 are secured ratchet wheels 80 and 81 engageable by pawls 82 and 83 so arranged as to transmit motion to the shafts 75 and 76 in either direction when rotating the drums by hand.

These drums are provided with clip securing means 46, the same extending in the form of bars longitudinally over the faces of the drums and carried by lever elements 47, pivoted at the ends of the drums. These clips are drawn into engagement by the springs 48 and are merely raised when it is desired to change the endless tape 49, which is adapted to be rolled from one drum to the other.

The bearings for the spindles 75 and 76 are engaged in slideways 53, formed with the casing 27, and having openings 54 through which the spindle bearings may pass, the openings being normally covered by blocks carried at the ends of levers 56, mounted on pins 57, the blocks being held in engagement by detents 59, carried at the ends of stems 60, provided with extending operating knobs 61, slidably engaged on pins 62, these pins are pressed outward from the recess 63 by springs 64, normally holding the detents 59 in engagement with the interior of the slideways, or, if it be preferred, the plates 65 covering the ends of the slideways, may be removed, to permit entering the bearing blocks.

An opening 68 is formed through the front of the casing 27 through which inscriptions placed upon the tape 49 become visible as they are passed between the rollers 30 and 31, over guide rollers 69 rotatably mounted in the casing adjacent to the opening, and in order to maintain the inscribed tape in a properly taut condition, spirally coiled flat springs 70 are secured to the inner wall of the cylinder drums 40 and 41 at their outer convolutions, while their inner coils are secured upon the shafts on which they rotate.

From the foregoing it will be seen that as the car advances, the drums are constantly rotated at a slow rate of speed, due to the reduction, so that the locations, as indicated in Figure 1, are disposed in consecutive order through the opening at such point in the car as to be readily visible from within it.

Having thus described my invention what I claim as new and desire to secure by Letters Patent, is—

In a street car indicator of the character described, including two guide rollers and a tape guided between both rollers, means for regulating the pressure between the tape guiding rollers, said means comprising recessed blocks in which the shaft of one of said rollers is journaled, upper bearings slidably arranged within the recess of said block in which the shaft of the other of said rollers is journaled, pairs of springs on which said bearings rest and screws provided with operating heads for pressing said bearings downwardly, substantially as described and for the purpose set forth.

In testimony whereof I have affixed my signature.

ANTONI LUCYSHYN.